US006852823B2

(12) United States Patent
Sunkara et al.

(10) Patent No.: US 6,852,823 B2
(45) Date of Patent: Feb. 8, 2005

(54) POLYURETHANE AND POLYURETHANE-UREA ELASTOMERS FROM POLYTRIMETHYLENE ETHER GLYCOL

(75) Inventors: Hari B. Sunkara, Wilmington, DE (US); Edwin L. McInnis, Lincoln University, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/215,575

(22) Filed: Aug. 9, 2002

(65) Prior Publication Data

US 2004/0030060 A1 Feb. 12, 2004

(51) Int. Cl.[7] ................. C08G 18/48; C08G 18/10; C07C 269/02; C07C 271/08
(52) U.S. Cl. ............. 528/61; 252/182.2; 252/182.22; 528/63; 528/64; 528/65; 528/76; 560/25; 560/26; 560/115; 560/158; 560/330; 560/336
(58) Field of Search .................. 252/182.2, 182.22; 528/61, 63, 64, 65, 76; 560/25, 26, 115, 158, 330, 336

(56) References Cited

U.S. PATENT DOCUMENTS

| 2,520,733 A | * | 8/1950 | Morris et al. ............. 568/619 |
| 3,326,985 A | * | 6/1967 | Mason .................... 568/621 |
| 3,384,623 A | | 5/1968 | Inoue et al. ................ 528/49 |
| 3,963,681 A | * | 6/1976 | Kaneko et al. ............. 528/61 |
| 4,277,577 A | | 7/1981 | Burg et al. ............... 525/154 |
| 4,482,750 A | | 11/1984 | Hetzel et al. ............. 568/621 |
| 4,656,211 A | | 4/1987 | Nasu et al. ............... 524/198 |
| 4,970,295 A | * | 11/1990 | Schuchardt ............... 528/416 |
| 5,340,902 A | | 8/1994 | Smith et al. ............... 528/61 |
| 5,403,912 A | | 4/1995 | Gunatillake et al. ........ 528/425 |
| 5,430,122 A | | 7/1995 | Drysdale .................. 528/55 |
| 5,436,314 A | | 7/1995 | Yang et al. ............... 528/274 |
| 5,565,270 A | | 10/1996 | Rehboid et al. ........... 428/364 |
| 5,574,124 A | | 11/1996 | Schmalstieg et al. ........ 528/59 |
| 5,659,089 A | | 8/1997 | Cai et al. ................. 568/619 |
| 5,691,441 A | | 11/1997 | Seneker et al. ............ 528/61 |
| 5,840,233 A | | 11/1998 | Foss ..................... 264/176.1 |
| 5,843,357 A | | 12/1998 | Seneker et al. ............ 264/204 |
| 5,990,258 A | | 11/1999 | Peter ..................... 528/65 |
| 5,993,944 A | | 11/1999 | Honna et al. ............. 428/198 |
| 6,017,625 A | | 1/2000 | Sato et al. ................ 428/364 |
| 6,046,302 A | | 4/2000 | Buning et al. ............. 528/272 |
| 6,235,948 B1 | | 5/2001 | Sunkara et al. ............ 568/868 |
| 6,300,463 B1 | | 10/2001 | Figuly et al. ............. 528/310 |
| 2002/0007043 A1 | | 1/2002 | Sunkara et al. ............ 528/396 |
| 2002/0010374 A1 | | 1/2002 | Sunkara et al. ............ 568/619 |

FOREIGN PATENT DOCUMENTS

| EP | 0 385 632 A2 | 9/1990 |
| JP | 57101016 | 6/1982 |
| JP | 58018412 | 2/1983 |
| JP | 04011011 | 1/1992 |
| JP | 2000-038434 | 8/2000 |
| JP | 2002-160920 A | 6/2002 |
| WO | WO 94/09055 | 4/1994 |
| WO | WO 96/13540 | 5/1996 |
| WO | WO 97/13798 | 4/1997 |
| WO | WO 99/01496 | 1/1999 |
| WO | WO 99/11688 | 3/1999 |
| WO | WO 99/63138 | 12/1999 |
| WO | WO 01/72867 A2 | 10/2001 |

OTHER PUBLICATIONS

M.C.E.J. Niesten et al., "Melt Spinnable Spandex Fibers from Segmented Copolyetheresteraramids", 82 Journal of Applied Polymer Sciences 2194–2203 (2001).

T.C. Forschner, et al., "Utilization of 1.3–Propandiol in Thermoplastic Elastomers (TPUs)", Shell Chemicals Ltd. (1999).

T.C. Forschner, et al., "Polyurethane Hot Melt Adhesives Base on 1,3–Propanediol", Shell Chemicals Ltd. (1999).

F. Smith, et al., "Modification of Acrylic Urethane Coatings with Polytrimethylene Carbonates", Shell Chemicals Ltd. (2000).

A. Camara–Hinojosa et al., Poly(Trimethylene Carbonate) Polyois in Polyurethane Elastomers, Shell Chemicals Ltd. (2000).

Shell Chemicals, "Chemical Properties" www.shellchemicals.com/chemicals/products/general_prod/o. 1174,309,00.html (1999).

Shell Chemicals, "1,3–Propanediol Experiment", (2002).

H. Desai, et al., "Synthesis of Narrow Molecular Weight Distribution χ,ω–hydroxy Telechelic Polyoxetane by the Activated Monomer Mechanism", Polymer, vol. 34, No. 3, 642–645 (1993).

S. V. Conjeevaram et al., "Block Copolyurethanes Based on Polyoxytrimethylene Glycols", Journal of Polymer Science, Polymer Chemistry Edition, vol. 23, 429–444 (1985).

S. D. Seneker et al., "New Ultra–Low Monol Polyols with Unique High–Performance Characteristics", Polyurethane Expo '96, 305–313 (1996).

C. Hepburn, "Basic Structure of a Polyurethane Elastomer", Polyurethane Elastomers, 5–7 (1982).

P. A. Gunatillake, et al. "Synthesis and Characterization of Hydroxy–Terminated Poly(alkylene oxides) by Condensation Polymerization of Diols", Polymer International, vol. 27, No. 3, 275–283 (1992).

W. Meckel et al., "Thermoplastic Polyurethane Elastomers", Thermoplastic Elastomers, $2^{nd}$ Edition, 16–45 (1996).

(List continued on next page.)

Primary Examiner—Rabon Sergent
(74) Attorney, Agent, or Firm—Mark D. Kuller

(57) ABSTRACT

Polyurethanes or polyurethane-ureas prepared from: (a) polytrimethylene ether glycol having a number average molecular weight in the range of about 1,000 to about 4,000 and unsaturated end groups in the range of about 0.003 to about 0.015 meq/g; (b) diisocyanate; and (c) diol or diamine chain extender; and their manufacture, intermediates and use.

62 Claims, No Drawings

OTHER PUBLICATIONS

M. J. Rhoad, et al., "The Synthesis of Polymeric Ethers", Contribution No. 169 from the Goodyear Tire and Rubber Co., Research Laboratory (1949).

J. B. Rose, "Cationic Polymerisation of Oxacyclobutanes", Imperial Chemical Industries Limited, Plastics Division, Welwyn Garden City, Herts, (1955).

T. Saegusa, et al., "Macromolecules", American Chemical Society, vol. 4, No. 1, Jan.–Feb. 1–3 (1971).

K. Yamamoto, et al., "Limiting Viscosity Number Versus Molecular Weight Relations for Polyoxacyclobutane", Department of Polymer Science, Osaka University, Toyonaka, Japan, vol. 7, 267–273, Dec. 1965.

M. Y. Qureshi et al., Synthesis and Characterization of High Molecular Weight Poly(Trimethylene Oxide), Eur Polym. J. vol. 32, No. 6, 691–693 (1996).

F. Fourne, "Elastane Yarns: Production, Properties, Application", Chemiefasern Textilindustrie, vol. 44/96, Jul./Aug. 1994, 45–48.

C. C. Gonzalez et al., "Oligomerization of Oxetane and Synthesis of Polyterephthalates Derived from 1.3–propanediol and 3.3'–oxydipropanol", Makromol. Chem. 190. No. 6. Jun. 1989, 1217–1224.

L. A. Dickinson, New Elastomers Derived from Copolymers of Tetrahydrofuran and Propylene Oxide, Journal of Polymer Science, vol. 58, 857–868 (1962).

English Abstract—JP 57101016, Jun. 23, 1982, Nisshing Spinning.

English Abstract—JP 58018412, Feb. 3, 1983, Unitika Ltd.

English Abstract—JP 04011011, Jan. 16, 1992, Kanebo Ltd.

English Abstract—DE 19824333, Dec. 9, 1999.

* cited by examiner

POLYURETHANE AND POLYURETHANE-UREA ELASTOMERS FROM POLYTRIMETHYLENE ETHER GLYCOL

FIELD OF THE INVENTION

This invention relates to polyurethane and polyurethane-urea elastomers, and their manufacture and use.

BACKGROUND OF THE INVENTION

Polyurethane and polyurethane-urea polymers are belong to the family of thermoplastic elastomers (TPE), and are typical block copolymers comprised of blocks of soft and hard segments. Soft segments form primarily from the polytrimethylene ether glycol and hard segments form primarily from the diisocyanate and chain extenders (the hydroxyl at the ends of the polyether glycols are considered to form part of the hard segment). Polyurethane and polyurethane-urea elastomers are widely used to make fibers, films, foams, resins, adhesives and coatings for various end uses, including automotive bumper covers, solid tires, industrial rollers, shoe soles and sport boots, as well as for biomedical and other applications.

Polyurethanes and polyurethane-ureas containing soft segments from polyalkylene ether glycols generally possess excellent hydrolytic stability, low-temperature flexibility, microbe resistance and rebound properties in addition to good mechanical properties. The polyalkylene ether glycols commonly used are poly(1,2-propylene ether)glycol ("PPG" or "polypropylene ether glycol") and polytetramethylene ether glycol ("PTMEG" or "PO4G"). Polyethylene glycols ("PEG"), due to their high degree of hydrophilicity, are not widely used in polyurethane industry. The choice of polyalkylene ether glycol to prepare urethane elastomers depends on cost, properties and performance.

The poly(1,2-propylene ether)glycol and polytetramethylene ether glycol soft segments differ in many aspects, for example both of these materials have different chemical structure, reactivity, dihydroxy functionality, molecular weight distribution and crystallinity, and hence, polyurethane elastomers prepared from these soft segments have different property attributes. Poly(1,2-propylene ether) glycol is a low cost polyether glycol which does not crystallize due to the presence of methyl pendant groups in the repeat unit, and has low viscosity and remains in the liquid state at room temperature. It can be handled with ease due to its low viscosity characteristics. However, it has many undesirable attributes including a less reactive secondary hydroxyl at one end, and a significant amount of unsaturation end groups that limits the molecular weight of the elastomers and, therefore, affects the properties. Also, poly (1,2-propylene ether)glycol has limited use in one-shot polyurethane synthesis, and therefore prepolymers are prepared first and then polymerized with a chain extender in the second step.

The molecular weight distribution is much narrower in poly(1,2-propylene ether)glycol, which sometimes can be a disadvantage. For example, S. D. Seneker et al, *"New Ultra-Low Monol Polyols with Unique High-Performance Characteristics,"* Polyurethane Expo '96, pages 305–313 (1996) ("Seneker"), which is incorporated herein by reference, describes the effect of polyol molecular weight distribution on the properties of polyurethane-urea elastomers where narrow distribution results in elastomers with poor tensile strength properties. It has been demonstrated to have a polyol with broad MWD in order to get good mechanical properties.

Poly(1,2-propylene ether)glycol polymer is also very susceptible to oxidation due to the presence of a tertiary carbon atom in the backbone. As a result, the poly(1,2-propylene ether)glycol-derived polyurethanes and polyurethane-ureas have low oxidative stability.

Recently a new class of poly(1,2-propylene ether)glycol polyether glycol with ultra-low unsaturation ends for improved elastomeric properties have been reported. See, e.g., Seneker. However, these polyether glycols still have the other deficiencies mentioned above.

Polytetramethylene ether glycol is a semi-crystalline, linear polymer with reactive hydroxyl groups at both ends and has functionality of 2. Polyurethane and polyurethane-urea elastomers derived from polytetramethylene ether glycol have superior performance. Unfortunately, polytetramethylene ether glycol is not an ideal soft segment for polyurethane and polyurethane-urea elastomers, and has many undesired attributes. Polytetramethylene ether glycol is a relatively more expensive polymer than poly(1,2-propylene ether)glycol. Also, it is solid at room temperature, has high degree of crystallinity, and has high melt viscosity. Because of high melting temperature and viscosity, this polymer should be stored and transported at above room temperature which is uneconomical and less efficient. In addition, polytetramethylene ether glycol-derived prepolymers and polymers are highly viscous and, as a result, the polyurethane and polyurethane-urea polymers are not easy to process and handle compared to the poly(1,2-propylene ether)glycol-derived elastomers. The polyurethane elastomers derived from polytetramethylene ether glycol show crystallization upon stretching, and polytetramethylene ether glycols exceeding certain molecular weights, usually above 1,800, tend to crystallize in copolymers and thus limits the elasticity of the final polyurethanes and polyurethane-ureas.

In general, the polypropylene ether glycol-derived elastomers are softer and possess high elasticity but poor tensile strength. In contrast, the polytetramethylene ether glycol-derived polyurethanes are harder and have lower elasticity, but higher tensile strength at the same levels of hard segment content. Thus the toughness of the elastomers is not high.

Polyurethane and polyurethane-urea elastomers can also be prepared using polytrimethylene ether glycol (PO3G) to form the soft segment; however, prior to this invention attempts to prepare high performance elastomers have been unsuccessful. For example, the polytrimethylene ether glycols disclosed by Mason in U.S. Pat. No. 3,326,985, which is incorporated herein by reference, were limited to molecular weights of about 1,200 to 1,400 and contained 0.03 to 0.06 milliequivalents/gram of other chain ends including allyl and iodide groups. Attempts to make higher molecular weight required long reaction times and the resultant in polymer had very poor in functionality and was highly discolored.

Polyurethane-urea elastomer compositions derived from polyoxetane polymer are described by S. V. Conjeevaram et al., *"Block Copolyurethanes Based on Polyoxytrimethylene Glycols"*, Journal of Polymer Science, Polymer Chemistry Edition, Volume 23, pp. 429 to 444 (1985). The polyoxetane polymers obtained from this process is of only academic interest due to the monomer instability, cost and commercial unavailability in large quantities.

It is highly desirable to have elastomers possessing high tensile and high elastic properties as well. It is also highly desirable to have a polyalkylene ether glycol which can overcome most of the above mentioned drawbacks, if not all. For example, a polyalkylene ether glycol ideally should have reactive primary hydroxyls at chain ends, low melting, low viscosity and crystallize at a slower rate for easier handling and processing, and should result in polyurethanes with superior elastic performance while retaining other good mechanical properties.

SUMMARY OF THE INVENTION

This invention is directed to polyurethane and polyurethane-urea prepared from: (a) polytrimethylene ether glycol having a number average molecular weight in the range of about 1,000 to about 4,000 and unsaturated end groups in the range of about 0.003 to about 0.015 meq/g; (b) diisocyanate; and (c) diol or diamine chain extender, and their manufacture, intermediates and use.

In one preferred embodiment, the invention is a polyurethane and the chain extender is the diol chain extender. In another preferred embodiment, the invention is a polyurethane-urea and the chain extender is the diamine chain extender.

The polytrimethylene ether glycols preferably contain at least about 0.005 meq/g, and preferably up to about 0.014 meq/g, more preferably up to about 0.012 meq/g unsaturated end groups. In one preferred embodiment, they contain greater than 0.005 meq/g, even more preferably at least 0.006 meq/g, of unsaturated end groups.

Preferably the polytrimethylene ether glycol has up to about 0.005 meq/g of end groups from acid catalyst.

Preferably the PO3G has up to about 0.005 meq/g of sulfur containing end groups, and has 0.005 meq/g or less, preferably no, iodide containing end groups.

In one preferred embodiment, the ratio of total reactive groups contained in the polytrimethylene ether glycol and chain extender components to the isocyanate groups is greater than 1:1. In another preferred embodiment, the ratio of total reactive groups contained in the polytrimethylene ether glycol and chain extender components to the isocyanate groups is 0.8:1 to 1:1.

In one preferred embodiment, the polytrimethylene ether glycol is blended with other polyether glycol. Preferably the polytrimethylene ether glycol is blended with up to 50 weight % of other polyether glycol. Preferably the other polyether glycol is selected from the group consisting of polyethylene glycol, poly(1,2-propylene glycol), polytetramethylene glycol and combinations thereof.

In another preferred embodiment, the polytrimethylene ether glycol is not blended with another polyether glycol.

In one preferred embodiment, wherein the polytrimethylene ether glycol comprises a blend of higher and lower molecular weight polytrimethylene ether glycols. Preferably the higher molecular weight polytrimethylene ether glycol has a number average molecular weight of about 2,000 to about 4,000 and the lower molecular weight polytrimethylene ether glycol has a number average molecular weight of about 150 to about 500.

The invention is also directed to a diisocyanate-terminated polytrimethyleneether-urethane prepolymer prepared from: (a) polytrimethylene ether glycol having a number average molecular weight in the range of about 1,000 to about 4,000 and unsaturated end groups in the range of about 0.003 to about 0.015 meq/g; and (b) diisocyanate.

The invention is further directed to a process of producing diisocyanate-terminated polytrimethyleneether-urethane prepolymer comprising: (a) providing (i) diisocyanate and (ii) polytrimethylene ether glycol having a number average molecular weight in the range of about 1,000 to about 4,000 and unsaturated end groups in the range of about 0.003 to about 0.015 meq/g; and (b) reacting the diisocyanate and the polytrimethylene ether glycol while maintaining an NCO:OH equivalent ratio of about 1.1:1 to about 10:1 to form the diisocyanate-terminated polytrimethyleneether-urethane prepolymer.

In addition, the invention is directed to a process of producing polyurethane or polyurethane-urea comprising: (a) reacting (i) diisocyanate and (ii) polytrimethylene ether glycol having a number average molecular weight in the range of about 1,000 to about 4,000 and unsaturated end groups in the range of about 0.003 to about 0.015 meq/g while maintaining an NCO:OH equivalent ratio of about 1.1:1 to about 10:1 to form diisocyanate-terminated polytrimethyleneether-urethane prepolymer; and (b) reacting the diisocyanate-terminated polytrimethyleneether-urethane prepolymer with diol chain extender at an OH:NCO mole ratio of about 0.75:1 to about 1.15:1, or with diamine chain extender at $NH_2$:NCO mole ratio of about 0.85:1 to about 1.10:1, to form the polyurethane or the polyurethane-urea. A preferred embodiment further comprises curing the polyurethane or polyurethane-urea.

The invention is also directed to a process of producing polyurethane or polyurethane-urea comprising: (a) providing (i) diisocyanate, (ii) polytrimethylene ether glycol having a number average molecular weight in the range of about 1,000 to about 4,000 and unsaturation end groups in the range of about 0.003 to about 0.015 meq/g, and (iii) diol or diamine chain extender; and (b) reacting the diisocyanate, the polytrimethylene ether glycol, and the diol or diamine chain extender to form the polyurethane or the polyurethane-urea.

Next, the invention is directed to a process of producing polyurethane or polyurethane-urea comprising: (a) providing (i) diisocyanate-terminated polytrimethyleneether-urethane prepolymer and (ii) diol or diamine chain extender; and (b) reacting the diisocyanate-terminated polytrimethyleneether-urethane prepolymer with the diol chain extender at an OH:NCO mole ratio of about 0.75:1 to about 1.15:1, or with diamine chain extender at $NH_2$:NCO mole ratio of about 0.85:1 to about 1.10:1, more to form the polyurethane or the polyurethane-urea.

The invention is also directed to shaped articles comprising the polyurethane or polyurethane-urea.

The polytrimethylene ether glycol used in the invention is prepared from the acid catalyzed polycondensation of 1,3-propanediol. Polyurethane and polyurethane-urea elastomers derived from this polytrimethylene ether glycol have excellent tensile properties, elasticity and toughness, and these diisocyanate-terminated polytrimethyleneether-urethane prepolymers are easy to handle and transport.

DETAILED DESCRIPTION OF THE INVENTION

The invention is directed to polyurethane or polyurethane-urea compositions prepared from:

(a) polytrimethylene ether glycol having a number average molecular weight in the range of about 1,000 to about 4,000 and with unsaturated end groups in the range of about 0.003 to about 0.015 meq/g;

(b) diisocyanate; and (c) diol or diamine chain extender.

In the polyurethanes and polyurethane-ureas, soft segments form primarily from the polytrimethylene ether glycol and hard segments form primarily from the diisocyanate and chain extenders (the hydroxyl at the ends of the polyether glycols are considered to form part of the hard segment).

The polytrimethylene ether glycols used in the manufacture of this invention are prepared by the acid-catalyzed polycondensation of 1,3-propanediol, preferably as described in U.S. Published patent application Ser. Nos. 2002/7043 A1 and 2002/10374 A1, both of which are incorporated herein by reference. These polytrimethylene-ether glycols have a number of features which distinguish them from polytrimethylene ether glycols prepared from oxetane. Most notably, they contain unsaturated end groups, predominately allyl end groups, in the range of about 0.003 to about 0.015 meq/g, preferably at least about 0.005 meq/g, and preferably up to about 0.014 meq/g, more preferably up to about 0.012 meq/g. In one preferred embodiment, they contain greater than 0.005 meq/g, even more preferably at least 0.006 meq/g, of unsaturated end groups.

The polytrimethylene ether glycols have a number average molecular weight (Mn) in the range of about 1,000 to about 4,000, preferably up to 3,000.

Blends of polytrimethylene ether glycol can be used. For instance, the polytrimethylene ether glycol can comprise a blend of a higher and a lower molecular weight polytrimethylene ether glycol, preferably wherein the higher molecular weight polytrimethylene ether glycol has a number average molecular weight of 2,000 to 4,000 and the lower molecular weight polytrimethylene ether glycol has a number average molecular weight of 150 to 500. The Mn of polytrimethylene ether glycol should still be in the range of 1,000 to 4,000 when the blend is considered.

In one embodiment, the polytrimethylene ether glycol is blended with other polyethylene glycols. In this embodiment, the polytrimethylene ether glycol is preferably blended with up to about 50 weight %, more preferably up to about 25 weight %, and most preferably up to about 10 weight %, of the other polyether glycol. The other polyether glycol is preferably selected from the group consisting of polyethylene glycol, poly(1,2-propylene glycol), polytetramethylene glycol and combinations thereof. In another preferred embodiment, the polytrimethylene ether glycol is not so blended.

The polydispersity of the polytrimethylene ether glycol is preferably within the range of 1.5 to 2.1. Using blends of polytrimethylene ether glycols the polydispersity can be adjusted.

Preferably, the polytrimethylene ether glycol after purification has essentially no acid end groups. The polyurethane or polyurethane-ureas of the invention can contain 0 to about 0.005 meq/g of end groups from acid catalyst. Typical of acid end groups are those resulting from sulfur containing acid catalysts as described in U.S. Published patent application Ser. Nos. 2002/7043 A1 and 2002/10374 A1, and iodide containing catalysts as described in U.S. Pat. No. 3,326,985, all of which are incorporated herein by reference.

The small number of allyl end groups in the polytrimethylene ether glycols are useful to control poyurethane and polyurethane-urea molecular weight, while not unduly restricting it, so that elastomers ideally suited for fiber and other end-uses can be prepared. Thus, the polytrimethylene ether glycols can be considered to consist essentially of the compounds having the following formulae:

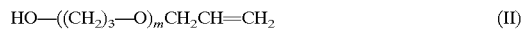

wherein m in a range such that the Mn is within the aforementioned Mn range. The compound of formula (I) constitutes all of the composition, with compounds of formula (II) being present in an amount such that the ally end groups (preferably all unsaturation ends or end groups) are present in the range of about 0.003 to about 0.015 meq/g.

Any diisocyanate useful in preparing polyurethanes and polyurethane-ureas from polyether glycols, diisocyanates and diols or amines can be used in this invention. They include 2,4-toluene diisocyanate, 2,6-toluene diisocyanate ("TDI"), 4,4'-diphenylmethane diisocyanate or ("MDI"), 4,4'-dicyclohexylmethane diisocyanate ("H$_{12}$MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylyene diisocyanate, isophorone diisocyanate ("IPDI"), and combinations thereof. MDI, HDI, and TDI are preferred because of their ready commercial availability.

Polyurethanes are formed when diol chain extenders are used, as polytrimethylene ether glycols and alcohols bond to isocyanates to form urethane linkages. Polyurethane-ureas are formed when diamine chain extenders are used, as polytrimethylene ether glycols and isocyanates bond to form urethane linkages and amines bond to isocyanates to form urea linkages.

Any diol or diamine chain extender useful in preparing polyurethanes and polyurethane-ureas from polyether glycols, diisocyanates and diol or amine chain extenders can be used in this invention.

Diol chain extenders useful in making the polyurethanes used in the invention include ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis (hydroxyethoxy)benzene, bis(hydroxyethylene) terephthalate, hydroquinone bis(2-hydroxyethyl) ether, and combinations thereof. Preferred are ethylene glycol, 1,2-propylene glycol, 1,3-propanediol, 1,4-butanediol, 1,6-hexanediol, and 2-methyl-1,3-propanediol.

Diamine chain extenders useful in making the polyurethanes used in the invention include 1,2-ethylenediamine, 1,6-hexanediamine, 1,2-propanediamine, 4,4'-methylene-bis (3-chloroaniline) (also known as 3,3'-dichloro-4,4'-diaminodiphenylmethane) ("MOCA" or "Mboca"), dimethylthiotoluenediamine ("DMTDA"), 4,4'-diaminodiphenylmethane ("DDM"), 1,3-diaminobenzene, 1,4-diaminobenzene, 3,3'-dimethoxy-4,4'-diamino biphenyl, 3,3'-dimethyl-4,4'-diamino biphenyl, 4,4'-diamino biphenyl, 3,3'-dichloro-4,4'-diamino biphenyl, and combinations thereof.

The polyurethanes and polyurethane-ureas of the invention can be prepared by one-shot or multiple step methods. In a preferred multiple step process prepolymers are prepared from polytrimethylene ether glycol and diisocayante and, then, the prepolymers are chain extend with diol or diamine. Batch, semi-continuous, and continuous reactors can be employed.

In one embodiment, polyurethane or polyurethane-urea is prepared by (a) providing (i) the diisocyanate, (ii) the polytrimethylene ether glycol, and (iii) the diol or amine chain extender; and reacting the diisocyanate, the polytrimethylene ether glycol and the diol chain extender to form the polyurethane or the polyurethane-urea. This reaction is preferably carried out at about 40 to about 120° C., most preferably at about 80 to about 100° C. Preferably the ratio of isocyanate groups to the sum of isocyanate reactive groups is close to 1.0:1 for optimum results where crosslinking is not desired. If this ratio is less than 0.96:1, the molecular weight of the resulting polymers are lower than desired. On the other hand, if the ratio is above 1.1:1 crosslinking can occur. The preferred ratio is about 0.98:1 to 1.02:1 for thermoplastic elastomers.

In another embodiment, a diisocyanate-terminated polytrimethyleneether-urethane prepolymer is produced by reacting the diisocyanate and the polytrimethylene ether glycol while maintaining an NCO:OH equivalent ratio of about 1.1:1 to about 10:1, preferably at least about 1.5:1, more preferably at least about 1.6:1, most preferably at least about 2:1, and preferably up to about 8:1, preferably at a temperature of about 40° C. to about 120° C., more preferably about 50° C. to about 100° C., to form the prepolymer. Then, reaction of the diisocyanate-terminated polytrimethyleneether-urethane prepolymer and the diol chain extender is carried out while maintaining an OH:NCO mole ratio of about 0.75:1 to about 1.15:1, preferably at least about 0.8:1, more preferably about 0.95:1, and preferably up to about 1.05:1. Alternatively reaction of the diisocyanate-terminated polytrimethyleneether-urethane prepolymer and the diamine chain extender is carried out at a $NH_2$:NCO mole ratio of about 0.85:1 to about 1.10:1, preferably at least about 0.95:1, and preferably up to about 1.05:2, more preferably up to about 1.02:1, to form the polyurethane or the polyurethane-urea.

The prepolymer is stable and can be transported or moved to another location prior to curing in forming end-use products. Alternatively, the polyurethane or polyurethane-urea can be cured immediately. For instance, according to a preferred process the prepolymer is heated to about 60 to about 70° C., mixed with the diol or amine chain extender, and then they are mixed thoroughly with a high speed mixer. After mixing is complete, the formed homogeneous resin is degassed in order to remove entrained air and poured into preheated molds of the appropriate size and shape at about 80 to about 100° C. The molds are placed in an oven at about 80 to about 100° C. and cured for a requisite period of time, typically about 16 to about 24 hours.

Catalysts are not necessary to prepare the polyurethanes or polyurethane ureas, but provide advantages in their manufacture. The catalysts most widely used are tertiary amines and organo-tin compounds, and they can be used in the one-shot process, in making prepolymers, and in making polyurethanes or polyurethane ureas from prepolymers.

In one embodiment, the polyurethanes or polyurethane-urea has a ratio of isocyanate groups to total reactive groups contained in the polytrimethylene ether glycol and chain extender greater than or equal to 1:1, preferably up to about 1.15:1, more preferably up to about 1.05:1. These polymers are slightly crosslinked.

In another embodiment, the polyurethanes or polyurethane-urea has a ratio of isocyanate groups to total reactive groups contained in the polytrimethylene ether glycol and chain extender of less than 1:1, preferably about 0.80:1 to 0.99:1, more preferably about 0.95:1 to 0.99:1. These are elastomers, which are not crosslinked.

Additives can be incorporated into the polyether glycol, prepolymer, polyurethane or polyurethane-urea by known techniques. Useful additives include polyhydroxy functional branching agents, delusterants (e.g., $TiO_2$, zinc sulfide or zinc oxide), colorants (e.g., dyes), stabilizers (e.g., antioxidants (e.g., hindered phenols and amines), ultraviolet light stabilizers, heat stabilizers, etc.), fillers, flame retardants, pigments, antimicrobial agents, antistatic agents, optical brightners, extenders, processing aids, viscosity boosters, and other functional additives. As a specific example, polytrimethylene ether glycols are subject to oxidation during storage and a preferred antioxidant stabilizer is commonly known as butylated hydroxy toluene or BHT, used at a level of 50 to 500 micrograms/g based on the weight of the polytrimethylene ether glycol. The most preferred level is about 100 micrograms/g.

Polyurethane and polyurethane-urea elastomers are widely used to make fibers, films, foams, resins, adhesives and coatings for various end uses, including automotive bumper covers, solid tires, industrial rollers, shoe soles and sport boots as well as for biomedical and other applications.

The polyurethane and polyurethane-urea elastomers of the invention have excellent tensile and elastic properties, while retaining other good mechanical properties. The polytrimethylene ether glycols used to form them have reactive primary hydroxyls at chain ends, are low melting, have low viscosity, and crystallize at much slower rates than polytetramethylene ether glycol.

The polyurethanes and polyurethane-ureas of the invention are prepared from polytrimethylene ether glycols having a few allyl end groups, i.e., few unsaturated ends. The small number of unsaturated end-groups (allyl end groups) are only formed in the synthesis of polytrimethylene ether glycol from polycondensation of 1,3-propanediol, and are caused gy dehydration of the —$CH_2OH$ end-groups in the presence of the sulfuric acid catalyst or other acid catalysts. This eliminates the need or reduces the amount of chain terminators that are needed in order to prepare polyurethanes and polyurethane-ureas suitable for fiber end uses. That is, generally there is limit to the polyurethane or polyurethane-urea molecular weight suitable for use in preparing fibers. Polytrimethylene ether glycols made from oxetane and polytetramethylene ether glycol do not have allyl end groups or other such ends groups, and therefore it is necessary to add chain terminating agents to control polyurethane and polyurethane-urea molecular weight. Having a few dead ends (i.e., unsaturated end groups that do not react and thus restrict chain growth) in the polyether glycol (i.e., for example in polytrimethylene ether glycol prepared from the polycondensation), it is easier to produce the desired molecular weights without adding any chain terminating agent at all or little if necessary.

In fiber end use applications for example, there is both an upper and a lower limit in the polyurethanes and polyurethane-urea molecular weights. Lower molecular weight polymers can result in poor properties and higher molecular weight polymers are difficult to process into the desired form, such as, for example, fiber. The polyurethanes and polyurethane-urea elastomers having high molecular weight are generally undesirable for use in fibers. For example, it is known that the elastomers prepared using a polyether glycol having no dead ends (for example, polytetramethylene ether glycol) result in high molecular weight. Therefore, the addition of chain terminating agents is typically required to control the molecular weight of the polyurehtanes or polyurethane ureas. With the above-described ratio of few unsaturated ur dead ends in the polytrimethyleneether glycol used in the invention it is easier to produce the desired molecular weights without adding any chain terminating agent at all or little if necessary. The polytrimethylene ether glycols used in the invention contain a small number of allyl end groups which allow the practitioner to control the polyurethane and polyurethane-urea molecular weights within the desirable ranges.

The polyurethanes and polyurethane-ureas of the invention have significantly better tensile properties and tear strength than, and comparable elasticity to, polyurethanes and polyurethane-ureas from poly(1,2-propylene ether) glycol. In general, the polypropylene ether glycol-derived elastomers are softer and possess high elasticity but poor tensile strength.

Polytrimethylene ether glycol has good oxidative stability and is less susceptible to oxidation than poly(1,2-propylene ether)glycol, which is believed to be because there is no tertiary carbon in the repeat unit as in poly(1,2-propylene ether)glycol.

The polytrimethylene ether glycols used in this invention also provide superior results because they have two primary reactive hydroxyl groups, whereas poly(1,2-propylene ether)glycol has a less reactive secondary hydroxyl at one end. The presence of primary reactive hydroxyl chain ends enhance the reaction kinetics with diisocyanates. In addition, the polytrimethylene ether glycols have a small amount of unsaturated ends that less the practitioner control polyurethane and polyurethane-urea molecular weight, whereas poly(1,2-propylene ether)glycol has a significant amount of unsaturated end groups that limits the molecular weight of the elastomers.

The polyurethanes and polyurethane-ureas can be readily prepared in one-shot, where poly(1,2-propylene ether)glycol has limited use in one-shot polyurethane synthesis.

Further, polytrimethylene ether glycol have a broad molecular weight distribution (MWD) (as shown by polydispersity data) which results in good elastomer mechanical properties, whereas the molecular weight distribution is much narrower in poly(1,2-propylene ether)glycol.

The polyurethane elastomers of the invention derived from polytrimethylene ether glycol soft segment surprisingly have significantly higher elasticity than the polytetramethylene ether glycol-derived elastomers, while maintaining high tensile strength and toughness, and other good mechanical properties.

The polyurethane prepolymers of the invention derived from the polytrimethylene ether glycol have much lower viscosities than the polytetramethylene ether glycol-derived elastomers and therefore the processing of these materials are easier. Also the presence of primary reactive hydroxyls chain ends enhance the reaction kinetics with diisocyanates.

The polytrimethylene ether glycol-derived polyurethanes and polyurethane-ureas are less viscous and easier to process and handle than those derived from polytetramethylene ether glycol.

The polyurethanes and polyurethane-ureas of the invention have higher tear strength properties than those prepared from polytetramethylene ether glycol, which without intending to be limited is believed to be due to the polytrimethylene ether glycol soft segment having functionality lower than 2 (as a result of the unsaturated end groups) compared to the 2.0 functionality of the elastomers prepared with polytetramethylene ether glycol.

The polyurethanes and polyurethane-ureas of the invention have a more amorphous soft segment than those derived from polytetramethylene ether glycol so they have less tendency to crystallize upon stretching and have better elasticity.

Polytrimethylene ether glycol is more economical and efficient to use than polytetramethylene ether glycol as polytetramethylene ether glycol is more expensive and needs to be stored and transported at above room temperature. Polytrimethylene ether glycol has a lower degree of crystallinity and lower melt viscosity than polytetramethylene ether glycol, making polytrimethylene ether glycol easier to use.

Earlier work on the polymerization of 1,3-propanediol yielded products that were more limited not only in molecular weight and also in functionality, and those polytrimethylene ether glycols were not suitable for preparing suitable polyurethanes and polyurethane-ureas, and products therefrom. For example the polymers disclosed in U.S. Pat. No. 3,326,985 are limited to molecular weights of about 1,200 to 1,400 and contained 0.03 to 0.06 milliequivalents/gram of other chain ends including allyl and iodide groups. Attempts to make higher molecular weight required long reaction times and the result in polymer had very poor functionality and was highly discolored.

Although the polytrimethylene ether glycol can also be made by ring opening polymerization of cyclic ether, oxetane, as described by Conjeevaram et al. in J. Polymer Sci., Polymer Chemistry Ed, 28, 429 to 444 (1985), which is incorporated herein by reference, the polyoxetane polymer obtained from this process is of only academic interest due to the monomer instability, cost and commercial unavailability in large quantities. In contrast, the 1,3-propanediol is less hazardous material, very stable and available commercially at low cost from a chemical route and can be prepared from a biological route.

The concentrated sulfuric acid used during the polycondensation reaction forming the polytrimethylene ether glycols of the invention dehydrate some the chain ends, resulting in small amounts of allyl chain ends. As a result, the polytrimethylene ether glycol obtained from the acid catalyzed polycondensation process has low unsaturation end groups and, thus has functionality less than 2. The oxetane derived polytrimethylene ether glycols do not have these allyl chain ends, or other unsaturated ends, and it will be difficult to control the molecular weight of the polyurethanes and polyurethane-urea elastomers.

EXAMPLES

The following examples are presented for the purpose of illustrating the invention, and are not intended to be limiting. All parts, percentages, etc., are by weight unless otherwise indicated.

Test Methods

Absolute (Dynamic) Viscosity

ASTM method D445-83 and ASTM method D792-91 were used to determine the absolute (dynamic) viscosity and density of the polymer, respectively.

Melting Point ($T_m$), Crystallization Temperature ($T_c$) and Glass Transition Temperature ($T_g$)

Melting point ($T_m$), crystallization temperature ($T_c$) and glass transition temperature ($T_g$) were determined using the procedure of the American Society for Testing Materials ASTM D-3418 (1988) using a DuPont DSC Instrument Model 2100 (E. I. du Pont de Nemours and Co., Wilmington, Del. ("DuPont")), according to the manufacturer's instructions. The heating and cooling rates were 10° C. per minute.

Number Average Molecular Weight (Mn)/Hydroxyl Number

The number-average molecular weights (Mn) of polytrimethylene ether glycol was calculated from the hydroxyl number, which was determined according to ASTM E222 method.

Polydispersity (Mw/Mn)

Polydispersity (Mw/Mn) of the polymer was measured by GPC.

Color

Platinum-Cobalt (APHA) Standard (ASTM D1209).

Unsaturation

Unsaturation in polytrimethylene ether glycols was determined by ASTM D-4671. Since polytrimethyleneether gly cols have unsaturation at places other than unsaturated end groups, this measurement is used to determine the number of unsaturated end groups in a polytrimethylene ether glycol.

The unsaturated end groups can also be identified by NMR and then the number of unsaturated end groups can be calculated.

A commercial grade quality of 1,3-propanediol which is available from E. I. du Pont de Nemours and Company (Wilmington, Del.) was used in the examples below. The purity of this raw material is >99.8%.

Preparation of Polytrimethylene Ether Glycol
(PO3G) A—Mn 2,362

1,3-Propanediol (3.04 kg) and concentrated sulfuric acid (30.4 g) were placed in a 5 L three necked round bottom flask fitted with a nitrogen inlet, mechanical stirrer and a distillation head. Nitrogen gas was bubbled through the reaction mixture for 15 minutes. The polymerization was carried out at 160° C. with stirring under a nitrogen atmosphere. After collecting 525 g water distillate in the receiving flask, the flask was connected to a vacuum pump and the pressure was reduced slowly to 1–5 mm Hg. The molecular weight of the reaction product was monitored by analyzing the samples at different time intervals using NMR end group analysis method. The polymerization was halted after obtaining the desired molecular weight (around 2,000) and the product was purified as described below.

Equal volume of water was added to the crude polymer and the reaction mixture was maintained at 90° C. for about 16 hours and a stirring speed of 180 rpm under nitrogen atmosphere. After about 16 hours, the heater and the stirrer were turned off and the mixture was allowed to phase separate. The top aqueous phase was decanted and the polyether phase was washed further with distilled water three more times to extract out most of the acid and the oligomers. The residual acid left in the polyether glycol was neutralized with excess lime. The polymer was dried at about 100° C. under reduced pressure for 2–3 hours and then the dried polymer was filtered hot through a Whatman filter paper precoated with a Celite filter aid. The polyether glycol was analyzed and the polymer properties are listed in Table A below.

Preparation of Polytrimethylene Ether Glycol B—
Mn 2078

1,3-Propanediol (13.9 kg) and concentrated sulfuric acid (139 g) were placed in a 22 L multi-necked round bottom flask fitted with a nitrogen inlet, mechanical stirrer and a distillation head. Nitrogen gas was bubbled through the reaction mixture for 30 minutes. The polymerization was carried out at 160–165° C. with stirring under a nitrogen atmosphere. After collecting 2,400 mL water distillate in the receiving flask, the flask was connected to a vacuum pump and the pressure was reduced slowly to 1–5 mm Hg. The molecular weight of the reaction product was monitored by analyzing the samples at different time intervals using NMR end group analysis method. The polymerization was halted after 25 hours and the crude polymer was purified as follows. Equal volume of water was added to the crude polymer (4.650 kg) and the reaction mixture was maintained at 100° C. for about 6 hours and a stirring speed of 180 rpm under nitrogen atmosphere. After 6 hours, the heater and the stirrer were turned off and the mixture was allowed to phase separate. The top aqueous phase was decanted and the polyether phase was washed further with distilled water three more times to extract out most of the acid and the oligomers. The residual acid left in the polyether glycol was neutralized with excess lime. The polymer was dried at about 100° C. under reduced pressure for 2–3 hours and then the dried polymer was filtered hot through a Whatman filter paper precoated with a Celite filter aid. The polyether glycol was analyzed and the polymer properties are listed in Table A.

TABLE A

Properties of Polytrimethylene Ether Glycols

| PO3G | A | B |
|---|---|---|
| Mn | 2,362 | 2,078 |
| Hydroxyl number | 47.5 | 55.0 |
| Color, APHA | 100 | 127 |
| Unsaturation, meq/g | 0.012 | 0.014 |
| Viscosity at 40° C., cP | 940 | 740 |
| Tg | −73 | −74.7 |
| Tc | −34 | −35 |
| $T_m$, C. | 22.8 | 21 |

Examples 1 to 9

In Examples 1 to 9, diisocyanate-terminated polytrimethyleneether-urethane prepolymer (MDI terminated prepolymers) were prepared as follows.

Molten (50° C.) 4,4' diphenyl methane diisocyanate (MDI) (Isonate 125M, Dow Chemical Company, Midland, Mich.) was added to a 1-L four-necked flask equipped with a mechanical stirrer, addition funnel, thermocouple, and a gas inlet adapter. The reactor was blanketed with dry nitrogen and heated with an oil bath to keep the MDI molten. The polyether glycol was charged to the addition funnel and is added at a rate sufficient to maintain a reaction temperature of <70° C. After completion of the polyol addition, the reactor was held at 70 to about 80° C. until the NCO:OH reaction was complete. The prepolymer product was degassed and transferred hot to a clean dry plastic container and sealed under a nitrogen atmosphere until tested or used.

Example 1

A diisocyanate-terminated polytrimethyleneether-urethane prepolymer having a % NCO content of 6.99% was prepared from the PO3G prepared above, and MDI (3.75 mol MDI/mol PO3G).

Comparative Example 2

A diisocyanate-terminated polytetramethyleneether-urethane prepolymer having a % NCO content of 7.00% was prepared from Terathane® 2000 polytetramethylene ether glycol (PO4G) (Mn=2,013 gm/mol) (E. I. duPont de Nemours and Company, Inc., Wilmington, Del. (DuPont)) and MDI (3.38 mol MDI/mol PO4G).

Comparative Example 3

A diisocyanate-terminated polyether-urethane prepolymer having a % NCO content of 7.00% was prepared from Arcol Polyol-2000 poly(1,2-propylene ether) (PPG) (Lyondell Chemicals, Newton, Square, Pa.) (Mn=1,960 gm/mol), and MDI (3.33 mol MDI/mol PPG).

TABLE 1

Polyether-Urethane Prepolymer Properties

| Example | 1 | 2 | 3 |
|---|---|---|---|
| Polyol | PO3G | PO4G | PPG |
| Mn (gm/mol) | 2,362 | 2,013 | 1,960 |
| NCO:OH | 3.75:1 | 3.38:1 | 3.33:1 |

TABLE 1-continued

Polyether-Urethane Prepolymer Properties

| % NCO (theory) | 7.00 | 7.00 | 7.01 |
|---|---|---|---|
| % NCO (actual) | 6.99 | 7.00 | 7.00 |
| Time to completion (min) | 90 | 90 | 360 |

| Temp (° C.) | Viscosity (cP) | | |
|---|---|---|---|
| 50° C. | 2,040 | 4,190 | 935 |
| 75° C. | 762 | 1350 | 277 |
| 100° C. | 367 | 585 | 121 |

As can be seen from the Table, the prepolymer based on PO3G had lower viscosity than the prepolymer based on PO4G, even though the PO3G had a higher molecular weight. It also had a higher viscosity than the prepolymer based on PPG.

Example 4

A diisocyanate-terminated polytrimethyleneether-urethane prepolymer having a % NCO content of 3.26% (theory=3.26%) was prepared from PO3G B (Mn=2,078 gm/mol) and MDI (2.0 mol MDI/mol PO3G).

Example 5

A diisocyanate-terminated polytrimethyleneether-urethane prepolymer having a % NCO content of 7.09% (theory=7.11%) was prepared from PO3G B (Mn=2,078 gm/mol) and MDI (3.5 mol MDI/mol PO3G).

Example 6

A diisocyanate-terminated polytrimethyleneether-urethane prepolymer having a % NCO content of 9.62% (theory=9.65%) was prepared from PO3G B (Mn=2,078 gm/mol) and MDI (4.75 mol MDI/mol PO3G).

Example 7

A diisocyanate-terminated polytetramethyleneether-urethane prepolymer having a % NCO content of 3.31% (theory=3.31%) was prepared from PO4G (Mn=2,038 gm/mol) and MDI (2.0 mol MDI/mol PO4G).

Example 8

A diisocyanate-terminated polytetramethyleneether-urethane prepolymer having a % NCO content of 7.20% (theory=7.21%) was prepared from PO4G (Mn=2,038 gm/mol) and MDI (3.5 mol MDI/mol PO4G).

Example 9

A diisocyanate-terminated polytetramethyleneether-urethane prepolymer having a % NCO content of 9.75% (theory=9.77%) was prepared from PO4G (Mn=2,038 gm/mol) and MDI (4.75 mol MDI/mol PO4G).

TABLE 2

MDI Prepolymer Properties

| | Polyol Structure | | | | | |
|---|---|---|---|---|---|---|
| | PO3G | | | PO4G | | |
| | Mn | | | | | |
| | 2,078 | | | 2,038 | | |
| Example | 4 | 5 | 6 | 7 | 8 | 9 |
| NCO:OH | 2.0:1 | 3.5:1 | 4.75:1 | 2.0:1 | 3.5:1 | 4.75:1 |
| % NCO (theory) | 3.26 | 7.11 | 9.65 | 3.31 | 7.21 | 9.77 |
| % NCO (actual) | 3.26 | 7.09 | 9.62 | 3.31 | 7.20 | 9.75 |

Example 10

Preparation of Polyurethane Elastomers from MDI Terminated Polyurethane Prepolymers Prepolymers (Examples 1–9) were heated to 70° C. and mixed with a diol chain extender (1,4-butanediol (BDO) or 1,3-propanediol (PDO)) at an OH:NCO mole ratio as specified in the tables below and mixed thoroughly with a high-speed mixer. After mixing was complete, the homogeneous resin was degassed in order to remove entrained air and poured into preheated molds 100° C. of the appropriate size and shape. The mold was placed in an oven 100° C. and cured for 24 hours. Samples were post-cured for a minimum period of 2 weeks at room temperature prior to testing.

TABLE 3

Polyurethane Elastomers from MDI Terminated Polyurethane Prepolymers

Ingredients

| Prepolymer | Example 1 | Example 2 | Example 3 |
|---|---|---|---|
| Polyol | PO3G | PO4G | PPG |
| Curative | BDO | BDO | BDO |
| OH:NCO Ratio | 0.98 | 0.98 | 0.98 |
| Property (Units) | | | |
| Hardness (Shore A)[a] | 90 | 88 | 80 |
| Tensile Strength (psi)[b] | 5,070 | 4,930 | 2,990 |
| Stress & 100% Strain (psi)[b] | 1,710 | 1,610 | 710 |
| Stress & 200% Strain (psi)[b] | 1,890 | 1,920 | 900 |
| Stress & 300% Strain (psi)[b] | 2,120 | 2,280 | 1,120 |
| Elongation[b] (%) | 633 | 462 | 616 |
| Tear Strength (lb/in)[c] | 602 | 531 | 370 |
| Resilience (%)[d] | 64 | 65 | 46 |
| Compression Set (Method B) (%)[e] | 27 | 30 | 39 |

[a]ASTM Method D2240.
[b]ASTM Method D412.
[c]ASTM Method D624.
[d]ASTM Method D2632.
[e]ASTM Method D395.

As can be seen from the Table, surprisingly PO3G-based polyurethanes have superior elastic properties than those of PO4G-based polyurethanes, with similar tensile strength properties. High tear strength is also notable for the PO3G based polyurethane elastomers. The $PO_3G$-based polyurethanes have significantly better tensile, resilience and tear properties than those based on PPG, and similar elastic properties. The PO3G-based polyurethanes have the best overall properties of the three elastomers.

TABLE 4

Polyurethane Elastomers from MDI Terminated Polyurethane Prepolymers (PO3G Based)

| | Prepolymer | | | | | |
|---|---|---|---|---|---|---|
| | Ex. 4 | | Ex. 5 | | Ex. 6 | |
| Curative | BDO | PDO | BDO | PDO | BDO | PDO |
| EW[g] | 45 | 38 | 45 | 38 | 45 | 38 |
| OH:NCO Ratio (Stoichiometry) | 0.95 | 0.95 | 0.95 | 0.95 | 0.95 | 0.95 |
| BDO/PDO[h] | 3.32 | 2.80 | 7.21 | 6.09 | 9.79 | 8.26 |
| Durometer Shore A | 64 | 67 | 87 | 86 | 95 | 95 |
| Durometer Shore D | — | — | — | — | 40 | 38 |
| Tear Strength[b], lb/in | 275 | 315 | 506 | 458 | 620 | 607 |
| Tear Resistance[c], lb/in | 68 | 87 | 142 | 130 | 185 | 174 |
| Tensile Strength[d], psi | —[a] | —[a] | 5,284 | 4,735 | 4,420 | 3,088 |
| Stress & 100% strain[d] | 321 | 326 | 919 | 910 | 1,413 | 1,356 |
| Stress & 200% strain[d] | 419 | 439 | 1,163 | 1,180 | 1,666 | 1,644 |
| Stress & 300% strain[d] | 550 | 558 | 1,411 | 1,466 | 1,946 | 1,972 |
| Elongation[d], % | —[a] | —[a] | 759 | 695 | 668 | 543 |
| Compression Set[e] | 65% | 69% | 24% | 30% | 21% | 30% |
| Resilience[f] | 66% | 69% | 64% | 64% | 55% | 57% |

[a]The test sample is stretched to the limits of the instron instrument but failed to break.
[b]ASTM Method D624.
[c]ASTM Method D470.
[d]ASTM Method D412.
[e]ASTM Method D395.
[f]ASTM Method D2632.
[g]EW = equivalent weight.
[h]Parts BDO or PDO per 100 parts polyurethane.

TABLE 5

Polyurethane Elastomers from MDI Terminated Polyurethane Prepolymers (PO4G Based)

| | Prepolymer | | | | | |
|---|---|---|---|---|---|---|
| | Ex. 7 | | Ex. 8 | | Ex. 9 | |
| Curative | BDO | PDO | BDO | PDO | BDO | PDO |
| EW[f] | 45 | 38 | 45 | 38 | 45 | 38 |
| OH:NCO Ratio (Stoichiometry) | 0.95 | 0.95 | 0.95 | 0.95 | 0.95 | 0.95 |
| BDO/PDO[g] | 3.37 | 2.84 | 7.33 | 6.19 | 9.92 | 8.38 |
| Durometer/Shore A | 72 | 73 | 90 | 88 | 95 | 95 |
| Durometer/Shore D | — | — | 42 | — | 45 | 43 |
| Tear Strength[a], lb/in | 242 | 270 | 451 | 418 | 599 | 552 |
| Tear Resistance[b], lb/in | 27 | 41 | 120 | 126 | 180 | 109 |
| Tensile Strength[c] psi | 2,397 | 1,978 | 4,229 | 2,904 | 3,896 | 2,963 |
| Stress & 100% strain[c] | 467 | 481 | 1,084 | 1,100 | 1,551 | 1,552 |
| Stress & 200% strain[c] | 638 | 650 | 1,468 | 1,489 | 1,994 | 2,002 |
| Stress & 300% strain[c] | 908 | 895 | 2,012 | 2,135 | 2,558 | 2,526 |
| Elongation[c], % | 440 | 434 | 454 | 370 | 456 | 345 |
| Compression Set[d] | 19% | 31% | 15% | 22% | 19% | 26% |
| Resilience[e] | 71% | 75% | 65% | 65% | 57% | 57% |

[a]ASTM Method D624.
[b]ASTM Method D470.
[c]ASTM Method D412.
[d]ASTM Method D395.
[e]ASTM Method D2632.
[f]Equivalent Weight.
[g]Parts BDO or PDO per 100 parts polyurethane.

As can be seen upon comparison of Tables 4 and 5, the elastic properties of the PO3G-based polyurethanes are significantly superior to those of PO4G-based polyurethanes and tear strengths for the PO3G based elastomers are also higher.

Examples 11 to 12

Toluene diisocyanate (TDI) terminated prepolymers were prepared as follows. Liquid TDI (Mondur TDS Grade 11, Bayer, Pittsburgh, Pa.) was added to a 1-L four-necked flask equipped with a mechanical stirrer, addition funnel, thermocouple, and a gas inlet adapter. The reactor was blanketed with dry nitrogen and glycol was charged to the addition funnel at a rate sufficient to maintain a reaction temperature of <70° C. After completion of the polyol addition, the reactor was heated at 70 to 80° C. with an oil bath until the NCO:OH reaction was complete. The prepolymer product was degassed and transferred hot to a clean dry plastic container and sealed under a nitrogen atmosphere until needed.

Example 11

A diisocyanate-terminated prepolymer having a % NCO content of 3.14% (theory=3.14) was prepared from PO3G (MW=2,078 gm/mol) and TDI (1.9 mol TDI/mol PO3G).

Example 12

A diisocyanate-terminated prepolymer having a % NCO content of 3.19% (theory=3.19) was prepared from PO4G (MW=2,038 gm/mol) and TDI (1.9 mol TDI/mol PO3G).

TABLE 6

TDI Prepolymer Properties

| Polyol Structure | PO3G | PO4G |
|---|---|---|
| Mn | 2,078 | 2,038 |
| Example | 10 | 11 |
| NCO:OH | 1.9 | 1.9 |
| % NCO (theory) | 3.14 | 3.19 |
| % NCO (actual) | 3.14 | 3.19 |

It was observed that prepolymers prepared with PO3G had lower viscosity than those prepared with PO4G.

Example 13

Preparation of Polyurethane-Urea Elastomers from TDI Terminated Polyurethane Prepolymers Prepolymers (Examples 11 to 12) were heated to 70° C. and mixed with a diamine chain extender (4,4'-methylene-bis(3-chloroaniline) ("MOCA" or "Mboca") (Miki Sangyo, Inc., New York, N.Y.), or Ethacure® 300 dimethylthiotoluenediamine ("E300" or "DMTDA") (Albemarle Chemical, Baton Rouge, La.) at an NH2:NCO mole ratio specified in the following Table and mixed thoroughly with a high-speed mixer. After mixing was complete, the homogeneous resin was degassed in order to remove entrained air and poured into preheated molds (100° C.) of the appropriate size and shape. The mold was placed in an oven (100° C.) and cured for 24 hours. Samples were post-cured for a minimum period of 2 weeks at room temperature prior to testing.

TABLE 7

Polyurethane-urea Elastomers from TDI Terminated Polyurethane Prepolymers (PO4G Based)

| | Polyol | | | |
|---|---|---|---|---|
| | PO4G Prepolymer | | PO3G Prepolymer | |
| | Ex. 11 | | Ex. 10 | |
| Curative | MBOCA | DMTDA | MBOCA | DMTDA |
| EW[g] | 133.5 | 107 | 133.5 | 107 |
| Stoichiometry | 0.95 | 0.95 | 0.95 | 0.95 |
| Durometer Shore A | 85 | 80 | 82 | 78 |
| Durometer Shore D | 29 | 26 | 26 | 25 |
| Tear Strength[b], lb/in | 342 | 371 | 340 | 383 |
| Tear Resistance[c], lb/in | 54 | 60 | 88 | 104 |
| Tensile Strength[d], psi | 4270 | 5,878 | 3,522 | —[a] |
| Stress & 100% strain[d] | 762 | 706 | 633 | 631 |
| Stress & 200% strain[d] | 1,013 | 928 | 788 | 822 |
| Stress & 300% strain[d] | 1,419 | 1,174 | 924 | 958 |
| Elongation[d], % | 457 | 560 | 758 | —[a] |
| Compression Set[e] | 18% | 29% | 41% | 45% |
| Resilience[f] | 60% | 62% | 60% | 61% |

[a]The test sample is stretched to the limits of the Instron instrument but failed to break.
[b]ASTM Method D624.
[c]ASTM Method D470.
[d]ASTM Method D412.
[e]ASTM Method D395.
[f]ASTM Method D2632.
[g]Equivalent Weight.

As can be seen from Table 7, the elastic properties and tear strength of the PO3G-based polyurethane-ureas are higher to those of PO4G-based polyurethane-ureas.

The foregoing disclosure of embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A polyurethane or polyurethane-urea prepared from a reaction mixture consisting essentially of:
    (a) polytrimethylene ether glycol having a number average molecular weight in the range of about 1,000 to about 4,000 and unsaturated end groups in the range of about 0.003 to about 0.015 meq/g;
    (b) diisocyanate; and
    (c) diol or diamine chain extender.

2. A polyurethane as claimed in claim 1 wherein the chain extender is the diol chain extender.

3. A polyurethane-urea as claimed in claim 1 wherein the chain extender is the diamine chain extender.

4. The polyurethane or polyurethane-urea of claim 1 wherein the polytrimethylene ether glycol has the unsaturated end groups in the range of about 0.005 to about 0.014 meq/g.

5. The polyurethane or polyurethane-urea of claim 1 wherein the polytrimethylene ether glycol has the unsaturated end groups in the range of about 0.005 to about 0.012 meq/g.

6. The polyurethane or polyurethane-urea of claim 1 wherein the polytrimethylene ether glycol has greater than 0.005 meq/g of the unsaturated end groups.

7. The polyurethane or polyurethane-urea of claim 1 wherein the polytrimethylene ether glycol has at least 0.006 meq/g of the unsaturated end groups.

8. The polyurethane or polyurethane-urea of claim 1 wherein the polytrimethylene ether glycol contains from 0 to about 0.005 meq/g of end groups from acid catalyst.

9. The polyurethane or polyurethane-urea of claim 1 wherein the polytrimethylene ether glycol contains from 0 to about 0.005 meq/g of iodide or sulfur containing end groups.

10. The polyurethane or polyurethane-urea of claim 1 in which the ratio of total reactive groups contained in the polytrimethylene ether glycol and chain extender components to the isocyanate groups is greater than 1:1.

11. The polyurethane or polyurethane-urea of claim 1 in which the ratio of total reactive groups contained in the polytrimethylene ether glycol and extender groups to the isocyanate groups is from 0.8:1 to 1:1.

12. The polyurethane or polyurethane-urea of claim 1, wherein the polytrimethylene ether glycol is blended with other polyether glycol.

13. The polyurethane or polyurethane-urea of claim 1, wherein the polytrimethylene ether glycol is blended with up to 50 weight % of other polyether glycol based on the total combined weight of the polyether glycols.

14. The polyurethane or polyurethane-urea of claim 13, wherein the other polyether glycol is selected from the group consisting of polyethylene glycol, poly(1,2-propylene glycol), polytetramethylene glycol and combinations thereof.

15. The polyurethane or polyurethane-urea of claim 1, wherein the polytrimethylene ether glycol is not blended with another polyether glycol.

16. The polyurethane or polyurethane-urea of claim 1, wherein the polytrimethylene ether glycol comprises a blend of a first polytrimethylene ether glycol and a second polytrimethylene ether glycol, said first polytrimethylene ether glycol and said second polytrimethylene ether glycol having different molecular weights.

17. The polyurethane or polyurethane-urea of claim 16 wherein said first polytrimethylene ether glycol has a number average molecular weight of about 2,000 to about 4,000 and said second polytrimethylene ether glycol has a number average molecular weight of about 150 to about 500.

18. A diisocyanate-terminated polytrimethyleneether-urethane prepolymer prepared from a reaction mixture consisting essentially of:
(a) polytrimethylene ether glycol having a number average molecular weight in the range of about 1,000 to about 4,000 and unsaturated end groups in the range of about 0.003 to about 0.015 meq/g, and
(b) diisocyanate.

19. A process of producing diisocyanate-terminated polytrimethyleneether-urethane prepolymer, said process consisting essentially of:
(a) providing (i) diisocyanate and (ii) polytrimethylene ether glycol having a number average molecular weight in the range of about 1,000 to about 4,000 and unsaturated end groups in the range of about 0.003 to about 0.015 meq/g; and
(b) reacting the diisocyanate and the polytrimethylene ether glycol while maintaining an NCO:OH equivalent ratio of about 1.1:1 to about 10:1 to form the diisocyanate-terminated polytrimethyleneether-urethane prepolymer.

20. A process of producing polyurethane or polyurethane-urea, said process consisting essentially of:
(a) reacting (i) diisocyanate and (ii) polytrimethylene ether glycol having a number average molecular weight in the range of about 1,000 to about 4,000 and unsaturated end groups in the range of about 0.003 to about 0.015 meq/g while maintaining an NCO:OH equivalent ratio of about 1.1:1 to about 10:1 to form diisocyanate-terminated polytrimethyleneether-urethane prepolymer;
(b) reacting the diisocyanate-terminated polytrimethyleneether-urethane prepolymer with diol chain extender at an OH:NCO mole ratio of about 0.75:1 to about 1.15:1, or with diamine chain extender at $NH_2$:NCO mole ratio of about 0.85:1 to about 1.10:1, to form the polyurethane or the polyurethane-urea.

21. The process of claim 20 further comprising curing the polyurethane or polyurethane-urea.

22. A process of producing polyurethane or polyurethane-urea, said process consisting essentially of:
(a) providing (i) diisocyanate, (ii) polytrimethylene ether glycol having a number average molecular weight in the range of about 1,000 to about 4,000 and unsaturated end groups in the range of about 0.003 to about 0.015 meq/g, and (iii) diol or diamine chain extender; and
(b) reacting the diisocyanate, the polytrimethylene ether glycol, and the diol or diamine chain extender to form the polyurethane or polyurethane-urea.

23. A process of producing polyurethane or polyurethane-urea, said process consisting essentially of:
(a) providing (i) diisocyanate-terminated polytrimethylenether-urethane prepolymer prepared from polytrimethylene ether glycol having a number average molecular weight in the range of about 1,000 to about 4,000 and unsaturated end groups in the range of about 0.003 to about 0.015 meq/g; and (ii) diol or diamine chain extender; and
(b) reacting the diisocyanate-terminated polytrimethyleneether-urethane prepolymer with the diol chain extender at an OH:NCO mole ratio of about 0.75:1 to about 1.15:1, or with diamine chain extender at extender at $NH_2$:NCO mole ratio of about 0.85:1 to about 1.10:1, to form the polyurethane or the polyurethane-urea.

24. A shaped article comprising the polyurethane or polyurethane-urea of claim 1.

25. A polyurethane as claimed in claim 2, wherein the diol chain extender is selected from ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, bis(hydroxyethylene)terephthalate, hydroquinone bis(2-hydroxyethyl)ether, and combinations thereof, and the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, and combinations thereof.

26. A polyurethane as claimed in claim 2, wherein the diamine chain extender is selected from 1,2-ethylenediamine, 1,6-hexanediamine, 1,2-propanediamine, 4,4'-methylene-bis(3-chloroaniline), dimethylthiotoluenediamine, 4,4'diaminodiphenylmethane, 1,3-diaminobenzene, 1,4-diaminobenzene, 3,3'dimethoxy-4,4'-diamino biphenyl, 3,3'-dichloro-4,4'-diamino biphenyl, and combinations thereof, and the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, and combinations thereof.

27. A polyurethane or polyurethane-urea as claimed in claim 1, further incorporating at least one functional additive.

28. A polyurethane or polyurethane as claimed in claim 27, wherein said functional additive is selected from polyhydroxy functional branching agents, delusterants, colorants, stabilizers, fillers, flame retardants, pigments, antimicrobial agents, antistatic agents, optical brightners, extenders, and viscosity boosters.

29. A molded article comprising a polyurethane or polyurethane-urea prepared in a mold from:
  (a) polytrimethylene ether glycol having a number average molecular weight in the range of about 1,000 to about 4,000 and unsaturated end groups in the range of about 0.003 to about 0.015 meq/g;
  (b) diisocyanate; and
  (c) diol or diamine chain extender.

30. An article comprising polyurethane or polyurethane-urea prepared from:
  (a) polytrimethylene ether glycol having a number average molecular weight in the range of about 1,000 to about 4,000 and unsaturated end groups in the range of about 0.003 to about 0.015 meq/g;
  (b) diisocyanate; and
  (c) a diol or diamine chain extender;
  said article selected from foams, adhesives and coatings.

31. A polyurethane or polyurethane-urea prepared from:
  (a) polytrimethylene ether glycol having a number average molecular weight in the range of about 1,000 to about 4,000 and unsaturated end groups in the range of about 0.003 to about 0.015 meq/g;
  (b) diisocyanate; and
  (c) diol or diamine chain extender;
  said polyurethane or polyurethane-urea being thermoplastic.

32. The thermoplastic polyurethane or polyurethane-urea of claim 31 wherein the ratio of isocyanate groups to total reactive groups contained in the polytrimethylene ether glycol and chain extender is 1.1:1 or less.

33. The thermoplastic polyurethane or polyurethane-urea of claim 31 wherein the ratio of isocyanate groups to total reactive groups contained in the polytrimethylene ether glycol and chain extender is from about 0.98:1 to 1.02:1.

34. A thermoplastic polyurethane as claimed in claim 31 wherein the chain extender is a diol chain extender.

35. A thermoplastic polyurethane-urea as claimed in claim 31 wherein the chain extender is a diamine chain extender.

36. The thermoplastic polyurethane or polyurethane-urea of claim 31 wherein the polytrimethylene ether glycol has the unsaturated end groups in the range of about 0.005 to about 0.014 meq/g.

37. The thermoplastic polyurethane or polyurethane-urea of claim 31 wherein the polytrimethylene ether glycol has the unsaturated end groups in the range of about 0.005 to about 0.012 meq/g.

38. The thermoplastic polyurethane or polyurethane-urea of claim 31 wherein the polytrimethylene ether glycol has greater than 0.005 meq/g of the unsaturated end groups.

39. The thermoplastic polyurethane or polyurethane-urea of claim 31 wherein the polytrimethylene ether glycol has at least 0.006 meq/g of the unsaturated end groups.

40. The thermoplastic polyurethane or polyurethane-urea of claim 31 wherein the polytrimethylene ether glycol contains from 0 to about 0.005 meq/g of end groups from acid catalyst.

41. The thermoplastic polyurethane or polyurethane-urea of claim 31 wherein the polytrimethylene ether glycol contains from 0 to about 0.005 meq/g of iodide or sulfur containing end groups.

42. The thermoplastic polyurethane or polyurethane-urea of claim 31, wherein the polytrimethylene ether glycol is blended with other polyether glycol.

43. The thermoplastic polyurethane or polyurethane-urea of claim 31, wherein the polytrimethylene ether glycol is blended with up to 50 weight % of other polyether glycol based on the total combined weight of the polyether glycols.

44. The thermoplastic polyurethane or polyurethane-urea of claim 41, wherein the other polyether glycol is selected from polyethylene glycol, poly(1,2-propylene glycol), polytetramethylene ether glycol and combinations thereof.

45. The thermoplastic polyurethane or polyurethane-urea of claim 31, wherein the polytrimethylene ether glycol is not blended with another polyether glycol.

46. The thermoplastic polyurethane or polyurethane-urea of claim 31, wherein the polytrimethylene ether glycol comprises a blend of a first polytrimethylene ether glycol and a second polytrimethylene ether glycol, said first polytrimethylene ether glycol and said second polytrimethylene ether glycol having different molecular weights.

47. The thermoplastic polyurethane or polyurethane-urea of claim 45 wherein said first polytrimethylene ether glycol has a number average molecular weight of about 2,000 to about 4,000 and said second polytrimethylene ether glycol has a number average molecular weight of about 150 to about 500.

48. A diisocyanate-terminated polytrimethyleneether-urethane prepolymer for a thermoplastic polyurethane or polyurethane-urea prepared from:
  (a) polytrimethylene ether glycol having a number average molecular weight in the range of about 1,000 to about 4,000 and unsaturated end groups in the range of about 0.003 to about 0.015 meq/g, and
  (b) diisocyanate.

49. A process of producing diisocyanate-terminated polytrimethyleneether-urethane prepolymer for a thermoplastic polyurethane or polyurethane-urea comprising:
  (a) providing (i) diisocyanate and (ii) polytrimethylene ether glycol having a number average molecular weight in the range of about 1,000 to about 4,000 and unsaturated end groups in the range of about 0.003 to about 0.015 meq/g; and
  (b) reacting the diisocyanate and the polytrimethylene ether glycol while maintaining an NCO:OH equivalent ratio of about 1.1:1 to about 10:1 to form the diisocyanate-terminated polytrimethyleneether-urethane prepolymer.

50. A process of producing thermoplastic polyurethane or polyurethane-urea comprising:
  (a) reacting (i) diisocyanate and (ii) polytrimethylene ether glycol having a number average molecular weight in the range of about 1,000 to about 4,000 and unsaturated end groups in the range of about 0.003 to about 0.015 meq/g while maintaining an NCO:OH equivalent ratio of about 1.1:1 to about 10:1 to form diisocyanate-terminated polytrimethyleneether-urethane prepolymer;
  (b) reacting the diisocyanate-terminated polytrimethyleneether-urethane prepolymer with diol chain extender at an OH:NCO mole ratio of about 1:1 to about 1.15:1, or with diamine chain extender at $NH_2$:NCO mole ratio of about 1.1 to about 1.10:1, to form the polyurethane or the polyurethane-urea.

51. The process of claim 49 further comprising curing the polyurethane or polyurethane-urea prepolymer.

52. A process of producing thermoplastic polyurethane or polyurethane-urea comprising:
(a) providing (i) diisocyanate (ii) polytrimethylene ether glycol having a number average molecular weight in the range of about 1,000 to about 4,000 and unsaturated end groups in the range of about 0.003 to about 0.015 meq/g, and (iii) diol or diamine chain extender; and
(b) reacting the diisocyanate, the polytrimethylene ether glycol, and the diol or diamine chain extender to form the polyurethane or polyurethane-urea.

53. A process of producing thermoplastic polyurethane or polyurethane-urea comprising:
(a) providing (i) diisocyanate-terminated polytrimethyleneether-urethane prepolymer prepared from polytrimethylene ether glycol having a number average molecular weight in the range of about 1,000 to about 4,000 and unsaturated end groups in the range of about 0.003 to about 0.015 meq/g; and (ii) diol or diamine chain extender; and
(b) reacting the diisocyanate-terminated polytrimethyleneether-urethane prepolymer with diol chain extender at an OH:NCO mole ratio of about 1:1 to about 1.15:1, or with diamine chain extender at $NH_2$:NCO mole ratio of about 1:1 to about 1.10:1, to form the polyurethane or the polyurethane-urea.

54. A shaped article comprising the thermoplastic polyurethane or polyurethane-urea of claim 31.

55. A thermoplastic polyurethane as claimed in claim 32, wherein the diol chain extender is selected from ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, bis(hydroxyethylene)terephthalate, hydroquinone bis(2-hydroxyethyl)ether, or combinations thereof, and the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, or combinations thereof.

56. A thermoplastic polyurethane as claimed in claim 32, wherein the diamine chain extender is selected from 1,2-ethylenediamine, 1,6-hexanediamine, 1,2-propanediamine, 4,4'-methylene-bis(3chloroaniline), dimethylthiotoluenediamine, 4,4'diaminodiphenylmethane, 1,3-diaminobenzene, 1,4-diaminobenzene, 3,3'dimethoxy-4,4'-diamino biphenyl, 3,3'-dichloro-4,4-diamino biphenyl, combinations thereof, and the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, or combinations thereof.

57. A polyurethane or polyurethane-urea prepared from a prepolymer and diol or diamine chain extender, wherein the prepolymer is prepared from:
(a) polytrimethylene ether glycol having a number average molecular weight in the range of about 1,000 to about 4,000 and unsaturated end groups in the range of about 0.003 to about 0.015 meq/g and
(b) diisocyanate;
wherein during the preparation of said prepolymer the ratio of isocyanate groups to reactive groups contained in the polytrimethylene ether glycol is from 1.1:1 to about 10:1.

58. The polyurethane or polyurethane-urea of claim 57 wherein the chain extender is a diol chain extender and the ratio of reactive groups in the chain extender to isocyanate groups in the prepolymer is from about 0.75:1 to about 1.15:1.

59. The polyurethane or polyurethane-urea of claim 57 wherein the chain extender is a diamine chain extender and the ratio of reactive groups in the chain extender to isocyanate groups in the prepolymer is from about 0.85:1 to about 1.10:1.

60. A non-crosslinked polyurethane or polyurethane-urea prepared from:
(a) polytrimethylene ether glycol having a number average molecular weight in the range of about 1,000 to about 4,000 and unsaturated end groups in the range of about 0.003 to about 0.015 meq/g;
(b) diisocyanate; and
(c) diol or diamine chain extender;
wherein the ratio of isocyanate groups to total reactive groups contained in the polytrimethylene ether glycol and chain extender is 1.1:1 or less.

61. The non-crosslinked polyurethane or polyurethane-urea of claim 60 wherein the ratio of isocyanate groups to total reactive groups contained in the polytrimethylene ether glycol and chain extender is from about 0.98:1 to 1.02:1.

62. The non-crosslinked polyurethane or polyurethane-urea of claim 60 wherein the ratio of isocyanate groups to total reactive groups contained in the polytrimethylene ether glycol and chain extender is about 1.0:1.

* * * * *

UNITED STATES PATENT AND TRADEMARK OFFICE
CERTIFICATE OF CORRECTION

PATENT NO. : 6,852,823 B2
DATED : February 8, 2005
INVENTOR(S) : Sunkara Hari Babu and McInnis Edwin L.

It is certified that error appears in the above-identified patent and that said Letters Patent is hereby corrected as shown below:

Title page,
Item [56], References Cited, OTHER PUBLICATIONS, "T.C. Forschner, et al.," reference, please replace "Base" with -- Based --; and "A. Camara-Hinojosa et al.," reference, please replace "Polyois" with -- Polyols --.

Column 6,
Line 2, please replace "ally" with -- allyl --.

Column 8,
Lines 25, please replace "gy" with -- by --.
Lines 55-56, please replace "poly-urehtanes" with -- polyurethanes --.
Line 57, please replace "ur" with -- or --.

Column 9,
Line 16, please replace "less" with -- lets --.

Column 12,
Table A, please replace "Tm, C." with -- Tm, ºC --.

Column 14,
Line 63, please replace "PO3G" with -- PO3G --.

Column 22,
Line 66, please replace "1.1" with -- 1.1:1 --.

Signed and Sealed this

Fourth Day of October, 2005

JON W. DUDAS
*Director of the United States Patent and Trademark Office*